(12) United States Patent
Kazmaier et al.

(10) Patent No.: US 7,655,366 B2
(45) Date of Patent: Feb. 2, 2010

(54) INKLESS REIMAGEABLE PRINTING PAPER AND METHOD

(75) Inventors: Peter M. Kazmaier, Mississauga (CA); Gabriel Iftime, Mississauga (CA); Tyler B. Norsten, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/762,144

(22) Filed: Jun. 13, 2007

(65) Prior Publication Data

US 2008/0311489 A1 Dec. 18, 2008

(51) Int. Cl.
*G03F 7/00* (2006.01)
*G03F 7/004* (2006.01)

(52) U.S. Cl. .............. 430/19; 430/270.1; 430/905; 430/270.15

(58) Field of Classification Search .............. 430/270.1, 430/905, 19
See application file for complete search history.

(56) References Cited

U.S. PATENT DOCUMENTS

| | | | |
|---|---|---|---|
| 3,825,427 A | 7/1974 | Inoue et al. | |
| 3,877,941 A | 4/1975 | Lohmann | |
| 3,961,948 A | 6/1976 | Saeva | |
| 4,425,161 A | 1/1984 | Shibahashi et al. | |
| 4,598,035 A * | 7/1986 | Usami et al. ................. | 503/213 |
| 4,659,649 A | 4/1987 | Dickinson et al. | |
| 4,931,337 A | 6/1990 | Miyazaki et al. | |
| 5,124,236 A * | 6/1992 | Yamaguchi et al. ....... | 430/281.1 |
| 5,262,280 A | 11/1993 | Knudsen et al. | |
| 5,376,511 A | 12/1994 | Tatezono et al. | |
| 5,458,874 A | 10/1995 | Pereira et al. | |
| 5,677,107 A | 10/1997 | Neckers | |
| 5,691,100 A | 11/1997 | Kudo et al. | |
| 5,691,395 A | 11/1997 | Knudsen et al. | |
| 5,747,225 A | 5/1998 | Manico et al. | |
| 6,067,185 A | 5/2000 | Albert et al. | |
| 6,103,378 A * | 8/2000 | Yao et al. ................. | 428/402.2 |
| 6,200,646 B1 | 3/2001 | Neckers et al. | |
| 6,528,221 B2 | 3/2003 | Takezawa et al. | |
| 6,579,662 B1 | 6/2003 | Zheng et al. | |
| 6,680,281 B2 * | 1/2004 | Tajiri et al. ................. | 503/209 |
| 6,761,758 B2 | 7/2004 | Boils-Boissier et al. | |
| 6,866,981 B2 | 3/2005 | Furukawa et al. | |
| 6,867,408 B1 * | 3/2005 | Gu et al. ................. | 250/201.5 |
| 6,906,118 B2 | 6/2005 | Goodbrand et al. | |
| 7,018,714 B2 | 3/2006 | Kobayashi et al. | |
| 7,057,054 B2 | 6/2006 | Irie et al. | |
| 7,205,088 B2 | 4/2007 | Iftime et al. | |
| 7,214,456 B2 | 5/2007 | Iftime et al. | |
| 7,229,740 B2 | 6/2007 | Iftime et al. | |
| 7,256,921 B2 | 8/2007 | Kumar et al. | |
| 7,332,257 B2 | 2/2008 | Miyako et al. | |
| 7,381,506 B2 | 6/2008 | Iftime et al. | |
| 7,441,887 B2 | 10/2008 | Senga et al. | |
| 2002/0160318 A1 | 10/2002 | Richter et al. | |
| 2003/0130456 A1 | 7/2003 | Kim et al. | |
| 2005/0012998 A1 | 1/2005 | Kumar et al. | |
| 2005/0244744 A1 | 11/2005 | Kazmaier et al. | |
| 2005/0269556 A1 * | 12/2005 | Evans et al. ................. | 252/586 |
| 2006/0001944 A1 | 1/2006 | Chopra et al. | |
| 2006/0222972 A1 | 10/2006 | Chopra et al. | |
| 2006/0222973 A1 | 10/2006 | Iftime et al. | |
| 2006/0236470 A1 | 10/2006 | Sabnis et al. | |
| 2006/0251988 A1 | 11/2006 | Iftime et al. | |
| 2006/0257785 A1 | 11/2006 | Johnson | |
| 2007/0054215 A1 | 3/2007 | Iftime et al. | |
| 2007/0072110 A1 | 3/2007 | Iftime et al. | |
| 2007/0112103 A1 | 5/2007 | Zhou et al. | |

FOREIGN PATENT DOCUMENTS

| | | |
|---|---|---|
| CA | 2 053 094 A1 | 4/1992 |
| DE | 29 06 193 A1 | 8/1980 |
| EP | 1 367 111 | 12/2003 |
| EP | 1 405 891 | 4/2004 |
| EP | 1 591 829 | 11/2005 |
| EP | 1 591 831 | 11/2005 |
| FR | 2774998 | 8/1999 |
| GB | 2 430 257 | 3/2007 |
| JP | 57-136645 | 8/1982 |

(Continued)

OTHER PUBLICATIONS

M. Irie, "Diarylethense for Memories and Switches," Chem Reviews, 100, pp. 1685-1716 (2000).

(Continued)

*Primary Examiner*—Amanda C. Walke
(74) *Attorney, Agent, or Firm*—Oliff & Berridge, PLC

(57) ABSTRACT

An image forming medium includes a substrate and an imaging layer coated on or impregnated into a substrate, where the imaging layer is formed of an imaging composition that includes a solvent or a polymeric binder, and a photochromic material selected from substituted fulgides and substituted dithienylethenes, dissolved or dispersed in the solvent or polymeric binder, and where the imaging composition exhibits a reversible homogeneous-heterogeneous transition between a colorless state, an intermediate colorless or colored erasable state, and a final colored stable state, the photochromic material converting from the colorless state to the colored stable state upon irradiation with light of a first wavelength and converting from the colored stable state to the colorless state upon exposure to heat and light.

22 Claims, No Drawings

FOREIGN PATENT DOCUMENTS

| | | |
|---|---|---|
| JP | A-61-175087 | 8/1986 |
| JP | A-5-265129 | 10/1993 |
| JP | A-11-30835 | 2/1999 |
| JP | A 11-322739 | 11/1999 |
| JP | A 2000-256347 | 9/2000 |
| JP | A-2002-179672 | 6/2002 |
| JP | A-2002-240441 | 8/2002 |
| JP | A-2002-285146 | 10/2002 |
| JP | A-2003-255489 | 9/2003 |
| JP | A-2003-255490 | 9/2003 |
| JP | A-2004-039009 | 2/2004 |
| JP | A-2004-045037 | 2/2004 |
| JP | A-2004-091638 | 3/2004 |
| JP | A-2004-149501 | 5/2004 |
| JP | A-2004-256780 | 9/2004 |
| JP | A-2005-082507 | 3/2005 |
| JP | A-2005-250463 | 9/2005 |
| WO | WO 97/31033 | 8/1997 |
| WO | WO 0016985 A1 * | 3/2000 |
| WO | WO 2006/039130 A1 | 4/2006 |
| WO | WO 2007/105699 A1 | 9/2007 |
| WO | WO 2008/043853 A2 | 4/2008 |

OTHER PUBLICATIONS

T. Hirose et al., "Self-Assembly of Photochromic Diarylethenes With Amphiphilic Side Chains: Reversible Thermal and Photochemical Control," J. Org. Chem., 71, pp. 7499-7508 (2006).

T. Norsten et al., "Photoregulation of Fluorescence in a Porphyrinic Dithienylethene Photochrome," J. Am. Chem. Soc., 123(8), pp. 1784-1785 (2001).

U.S. Appl. No. 11/762,152, filed Jun. 13, 2007, to Iftime et al.
U.S. Appl. No. 11/762,327, filed Jun. 13, 2007, to Iftime et al.
U.S. Appl. No. 11/762,147, filed Jun. 13, 2007, to Iftime et al.
U.S. Appl. No. 11/762,098, filed Jun. 13, 2007, to Iftime et al.
U.S. Appl. No. 11/762,157, filed Jun. 13, 2007, to Iftime et al.
U.S. Appl. No. 11/762,153, filed Jun. 13, 2007, to Iftime et al.
U.S. Appl. No. 11/762,144, filed Jun. 13, 2007, to Kazmaier et al.
U.S. Appl. No. 11/762,150, filed Jun. 13, 2007, to Norsten et al.
U.S. Appl. No. 11/762,107, filed Jun. 13, 2007, to Iftime et al.
U.S. Appl. No. 11/762,176, filed Jun. 13, 2007, to Norsten et al.
U.S. Appl. No. 11/762,307, filed Jun. 13, 2007, to Norsten et al.
U.S. Appl. No. 11/762,159, filed Jun. 13, 2007, to Kazmaier et al.
U.S. Appl. No. 11/762,311, filed Jun. 13, 2007, to Kazmaier et al.

O.M. Babeshko et al., "Spiro-2H-Oxocines", Khimiya Geterotsiklicheskikh Soedinenii, No. 11, pp. 1490-1492, Nov. 1976.

Samir Kumar Mandal et al., "Titanocene(III) mediated radical cyclizations of epoxides for the synthesis of medium-sized cyclic ethers", Tetrahedron, vol. 63, pp. 11341-11348, 2007.

Wojtyk et al., "Effects of metal ion complexation on the spiropyran-merocyanine interconversion: development of a thermally stable photo-switch," J. Chem. Soc. Chem, Comm., pp. 1703-1704, 1998.

Kentaro Morimitsu et al., "Dithienylethenes With a Novel Photochromic Performance," J. Org. Chem., vol. 67, pp. 4574-4578 (2002).

"Dolch Introduces World's First Ruggedized Notebook with Integrated Printer" available at http://news.thomasnet.com/fullstory/7005/447, pp. 1-4, Feb. 6, 2002.

Masamitsu Shirai et al., "Photoacid and Photobase Generators: Chemistry and Applications to Polymeric Materials," *Prog. Polym. Sci.* vol. 21, pp. 1-45 (1996).

Vladimir I. Minkin, "Photo-, Thermo-, Solvato-, and Electrochromic Spiroheterocyclic Compounds," Chemical Reviews, 104, 5, pp. 2751-2776 (2004).

Takayuki Suzuki et al., "Stabilization of the merocyanine form of photochromic compounds in fluoro alcohols is due to a hydrogen bond", Chem. Commun., 2685-2686 (1998).

Ronald F.M. Lange et al., "Supramolecular polymer interactions based on the alternating copolymer of styrene and Maleimide" Macromolecules, 28, 782-783 (1995).

Vladimir I. Minkin et al., "Perimidine spirocyclohexa dienones" in Organic Photochromic and Thermochromic Compounds, V1, Plenum Press, pp. 315-340 (1999).

John Biteau et al., "Photochromism of Spirooxazine-Doped Gels," J. Phys. Chem., 100, 9024-9031 (1996).

Leonard J. Prins et al., "Noncovalent Synthesis Using Hydrogen Bonding," Angew. Chem. Int. Ed., 40, 2382-2426 (2001).

Terry M. Cresp et al., "A Synthesis of $\alpha\beta$-Unsaturated Aldehydes," J. Chem. Soc., Perkin Trans., 1, pp. 37-41 (1974).

Elliot Berman et al., "Photochromic Spiropyrans. I. The Effect of Substituents on the Rate of Ring Closure," J. Am. Chem. Soc., 81, 5605-5608 (1959).

Sheng-Hua Liu et al., "Synthesis of Negative Photochromic Crowned Spirobenzopyrans," Syn. Commun., 30, 5, 895-902 (2000).

Yu M. Chunaev et al., "Reaction of the Fischer Base With Nitro- and Bromo-Substituted $\alpha$Hydroxycinnamaldehydes," Chem. Heterocycl. Compd., 628-631 (1984).

Kentaro Morimitsu et al., "Thermal Cycloreversion Reaction of a Photochromic Dithienylperfluorocyclopentene with *tert*-Butoxy Substituents at the Reactive Carbons," The Chemical Society of Japan, 2002, p. 572-573.

Sep. 9, 2009 European Office Action issued in European Application No. 08 155 983.3 - 1217.

* cited by examiner

INKLESS REIMAGEABLE PRINTING PAPER AND METHOD

TECHNICAL FIELD

This disclosure is generally directed to a substrate, method, and apparatus for inkless printing on reimageable paper. More particularly, in embodiments, this disclosure is directed to an inkless reimageable printing substrates, such as inkless printing paper utilizing a composition that is imageable and eraseable by heat and light, such as comprising a photochromic material such as a substituted fulgide or substituted dithienylethene dispersed in a solvent or polymeric binder, where the composition exhibits a reversible homogeneous-heterogeneous transition between a colorless state, an intermediate colorless or colored erasable state, and a final colored stable state. Imaging is conducted by applying UV light and optional heat to the imaging material to cause a color change, and erasing is conducted by applying heat followed by visible light to the imaging material to reverse the color change. Other embodiments are directed to inkless printing methods using the inkless printing substrates, and apparatus and systems for such printing.

CROSS-REFERENCE TO RELATED APPLICATIONS

Disclosed in commonly assigned U.S. patent application Ser. No. 11/123,163, filed May 6, 2005, is an image forming medium, comprising a polymer, a photochromic compound containing chelating groups embedded in the polymer, and a metal salt, wherein molecules of the photochromic compound are chelated by a metal ion from the metal salt.

Disclosed in commonly assigned U.S. patent application Ser. No. 10/835,518, filed Apr. 29, 2004, is an image forming method comprising: (a) providing a reimageable medium comprised of a substrate and a photochromic material, wherein the medium is capable of exhibiting a color contrast and an absence of the color contrast; (b) exposing the medium to an imaging light corresponding to a predetermined image to result in an exposed region and a non-exposed region, wherein the color contrast is present between the exposed region and the non-exposed region to allow a temporary image corresponding to the predetermined image to be visible for a visible time; (c) subjecting the temporary image to an indoor ambient condition for an image erasing time to change the color contrast to the absence of the color contrast to erase the temporary image without using an image erasure device; and (d) optionally repeating procedures (b) and (c) a number of times to result in the medium undergoing a number of additional cycles of temporary image formation and temporary image erasure.

Disclosed in commonly assigned U.S. patent application Ser. No. 10/834,722, filed Apr. 29, 2004, is a reimageable medium comprising: a substrate; and a photochromic material, wherein the medium is capable of exhibiting a color contrast and an absence of the color contrast, wherein the medium has a characteristic that when the medium exhibits the absence of the color contrast and is then exposed to an imaging light corresponding to a predetermined image to result in an exposed region and a non-exposed region, the color contrast is present between the exposed region and the non-exposed region to form a temporary image corresponding to the predetermined image that is visible for a specified period of time, wherein the medium has a characteristic that when the temporary image is exposed to an indoor ambient condition for an image erasing time, the color contrast changes to the absence of the color contrast to erase the temporary image in all of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature, and wherein the medium is capable of undergoing multiple cycles of temporary image formation and temporary image erasure.

Disclosed in commonly assigned U.S. patent application Ser. No. 11/220,803, filed Sep. 8, 2005, is an image forming medium, comprising: a substrate; and an imaging layer comprising a photochromic material and a polymer binder coated on said substrate, wherein the photochromic material exhibits a reversible homogeneous-heterogeneous transition between a colorless state and a colored state in the polymer binder.

Disclosed in commonly assigned U.S. patent application Ser. No. 11/220,572, filed Sep. 8, 2005, is an image forming medium, comprising: a substrate; and a mixture comprising a photochromic material and a solvent wherein said mixture is coated on said substrate, wherein the photochromic material exhibits a reversible homogeneous-heterogeneous transition between a colorless state and a colored state in the solvent.

Disclosed in commonly assigned U.S. patent application Ser. No. 11/123,163, filed May 6, 2005, is an image forming medium, comprising a polymer; and a photochromic compound containing chelating groups embedded in the polymer; and a metal salt; wherein molecules of the photochromic compound are chelated by a metal ion from the metal salt.

Disclosed in commonly assigned U.S. patent application Ser. No. 11/093,993, filed Mar. 20, 2005, is a reimageable medium, comprising: a substrate having a first color; a photochromic layer adjacent to the substrate; a liquid crystal layer adjacent to the photochromic layer, wherein the liquid crystal layer includes a liquid crystal composition; and an electric field generating apparatus connected across the liquid crystal layer, wherein the electric field generating apparatus supplies a voltage across the liquid crystal layer.

Disclosed in commonly assigned U.S. patent application Ser. No. 10/834,529, filed Apr. 29, 2004, is a reimageable medium for receiving an imaging light having a predetermined wavelength scope, the medium comprising: a substrate; a photochromic material capable of reversibly converting among a number of different forms, wherein one form has an absorption spectrum that overlaps with the predetermined wavelength scope; and a light absorbing material exhibiting a light absorption band with an absorption peak, wherein the light absorption band overlaps with the absorption spectrum of the one form.

Disclosed in the Journal of Organic Chemistry, volume 71, pages 7499-7508 published in 2006, is a 1,2-bis(2-methyl-5-phenyl-3-thienyl)perfluorocyclopentene was functionalized containing a chiral 1,2-dihydroxypropane moiety and then extended with polyethylene glycol. This compound showed some propensity to aggregate in water as indicated by a cloud point in aqueous solution, but the compound was molecularly dispersed in organic solvents. In this system both the ring open and ring closed form showed a propensity to aggregate in water.

The entire disclosure of the above-mentioned applications are totally incorporated herein by reference.

BACKGROUND

Inkjet printing is a well-established market and process, where images are formed by ejecting droplets of ink in an image-wise manner onto a substrate. Inkjet printers are widely used in home and business environments, and particularly in home environments due to the low cost of the inkjet printers. The inkjet printers generally allow for producing high quality images, ranging from black-and-white text to photographic images, on a ride range of substrates such as standard office paper, transparencies, and photographic paper.

However, despite the low printer costs, the cost of replacement inkjet cartridges can be high, and sometimes higher than the cost of the printer itself. These cartridges must be replaced frequently, and thus replacement costs of the ink cartridges is a primary consumer complaint relating to inkjet printing. Reducing ink cartridge replacement costs would thus be a significant enhancement to inkjet printing users.

In addition, many paper documents are promptly discarded after being read. Although paper is inexpensive, the quantity of discarded paper documents is enormous and the disposal of these discarded paper documents raises significant cost and environmental issues. Accordingly, there is a continuing desire for providing a new medium for containing the desired image, and methods for preparing and using such a medium. In aspects thereof it would be desirable to be reusable, to abate the cost and environmental issues, and desirably also is flexible and paper-like to provide a medium that is customarily acceptable to end-users and easy to use and store.

Although there are available technologies for transient image formation and storage, they generally provide less than desirable results for most applications as a paper substitute. For example, alternative technologies include liquid crystal displays, electrophoretics, and gyricon image media. However, these alternative technologies may not in a number of instances provide a document that has the appearance and feel of traditional paper, while providing the desired reimageability.

Imaging techniques employing photochromic materials, that is materials which undergo reversible or irreversible photoinduced color changes are known, for example, U.S. Pat. No. 3,961,948 discloses an imaging method based upon visible light induced changes in a photochromic imaging layer containing a dispersion of at least one photochromic material in an organic film forming binder.

These and other photochromic (or reimageable or electric) papers are desirable because they can provide imaging media that can be reused many times, to transiently store images and documents. For example, applications for photochromic based media include reimageable documents such as, for example, electronic paper documents. Reimageable documents allow information to be kept for as long as the user wants, then the information can be erased or the reimageable document can be re-imaged using an imaging system with different information.

Although the above-described approaches have provided reimageable transient documents, there is a desire for reimageable paper designs that provide longer image life-times, and more desirable paper-like appearance and feel. For example, while the known approaches for photochromic paper provide transient visible images, the visible images are very susceptible to UV, such as is present in both ambient interior light and more especially in sun light, as well as visible light. Due to the presence of this UV and visible light, the visible images are susceptible to degradation by the UV light, causing the unimaged areas to darken and thereby decrease the contrast between the desired image and the background or unimaged areas.

That is, a problem associated with transient documents is the sensitivity of the unimaged areas to ambient UV-VIS light (such as <420 nm) where the photochromic molecule absorbs. Unimaged areas become colored after a period of time, decreasing the visual quality of the document, because the contrast between white and colored state is reduced. One approach, described in the above-referenced U.S. patent application Ser. No. 10/834,529, is to stabilize the image against light of wavelength <420 nm by creating a band-pass window for the incident light capable of isomerising (i.e. inducing coloration) in the material, centered around 365 nm. However, the unimaged areas of the documents still are sensitive to UV-VIS light of wavelength centered around 365 nm. This modification is also applicable to the present disclosure, and thus is incorporated herein in its entirety by reference.

SUMMARY

It is desirable for some uses that an image formed on a reimageable medium such as a transient document remains stable for extended time periods, without the image or image contrast being degraded by exposure to ambient heat or visible light. However, it is also desired that the image can be erased when desired, to permit reimaging of the medium. Electronic paper documents should maintain a written image for as long as the user needs to view it, without the image being degraded by ambient heat or light. The image may then be erased or replaced with a different image by the user on command.

The present disclosure addresses these and other needs, in embodiments, by providing a reimageable image forming medium utilizing a composition that is imageable by ultraviolet light and erasable by heat and light, and which comprises a substituted fulgide or substituted dithienylethene dispersed in a solvent or polymeric binder, where the composition exhibits a reversible chemical change between a colorless and a colored compounds. Imaging is conducted by applying UV light and optional heat to the imaging material to cause a color change, and erasing is conducted by applying heat and visible light to the imaging material to reverse the color change. The difference in physical properties such as dipole moment, molecular structure and the orientation of substituents enables the aggregation of the colored compound and causes the colored compound to crystallize, further stabilizing the colored compound and preventing reversion to the colorless materials. The present disclosure in other embodiments provides an inkless printing method using the reimageable inkless printing substrates, and apparatus and systems for such printing.

The present disclosure thereby provides a printing media, method, and printer system for printing images without using ink or toner. The paper media has a special imageable composition and it is printed with light and can be erased with heat and visible light. The paper media thus allows image formation and erasure using a printer that does not require ink or toner replacement, and instead images the paper using a UV light source, such as a LED. The compositions and methods of the present disclosure also provide transient images that last for significantly longer periods of time, such as two days or more, before the image fades. These advantages, and others, allow wider application of the reimageable transient documents such as those described in the above-referenced applications.

In an embodiment, the present disclosure provides an image forming medium, comprising
a substrate; and
an imaging layer coated on or impregnated into said substrate, wherein the imaging layer comprises an imaging composition comprising:

a solvent or a polymeric binder, and
a photochromic material selected from the group consisting of substituted fulgides and substituted dithienylethenes, dissolved or dispersed in said solvent or polymeric binder;
wherein the imaging composition exhibits a reversible homogeneous-heterogeneous transition between a colorless state, an intermediate colorless or colored erasable state, and a final colored stable state, the photochromic material converting from the colorless state to the colored stable state upon irradiation with light of a first wavelength and converting from the colored stable state to the colorless state upon exposure to heat and light.

In another embodiment, the present disclosure provides a method of making an image forming medium, comprising applying an imaging layer composition to a substrate, wherein the imaging layer composition comprises a solvent or a polymeric binder, and a photochromic material selected from the group consisting of substituted fulgides and substituted dithienylethenes, dissolved or dispersed in said solvent or polymeric binder;
wherein the imaging composition exhibits a reversible homogeneous-heterogeneous transition between a colorless state, an intermediate colorless or colored erasable state, and a final colored stable state, the photochromic material converting from the colorless state to the colored stable state upon irradiation with light of a first wavelength and converting from the colored stable state to the colorless state upon exposure to heat and light In another aspect, the present disclosure provides a method of forming an image, comprising:
providing an image forming medium comprising:
a substrate; and
an imaging layer coated on or impregnated into said substrate, wherein the imaging layer comprises an imaging composition comprising a solvent or a polymeric binder, and a photochromic material selected from the group consisting of substituted fulgides and substituted dithienylethenes, dissolved or dispersed in said solvent or polymeric binder, wherein the imaging composition exhibits a reversible homogeneous-heterogeneous transition between a colorless state, an intermediate colorless or colored erasable state, and a final colored stable state, the photochromic material converting from the colorless state to the colored stable state upon irradiation with light of a first wavelength and converting from the colored stable state to the colorless state upon exposure to heat and light; and
exposing the image forming medium to UV irradiation of a first wavelength in an imagewise manner to form a visible image.

DETAILED DESCRIPTION OF EXEMPLARY EMBODIMENTS

Generally, in various exemplary embodiments, there is provided an inkless reimageable paper or image forming medium formed using a composition that is imageable and eraseable by heat and light, such as comprising a photochromic material that is a substituted fulgide or substituted dithienylethene dispersed in a solvent or polymeric binder, where the imaging composition exhibits a reversible homogeneous-heterogeneous transition between a colorless state, an intermediate colorless or colored erasable state, and a final colored stable state. Exposing the imaging layer to a first stimulus such as UV light irradiation causes the photochromic material to convert from a first state, which is a colorless non-aggregated state, to an intermediate colorless or colored erasable state. In this intermediate state, the imaging composition (photochromic material) can be in either a colored state where the photochromic material is not aggregated together, or a colorless state where the photochromic material is aggregated together. Further irradiation converts the photochromic material from the intermediate state to a final colored stable state, where the photochromic material is aggregated together. The molecular properties in the colored compound in combination with the binder materials induces a reversible formation of aggregates. These aggregates provide enhanced stability to the colored state and prevent fading until the aggregates are broken up by heat. By a colored state, in embodiments, refers to for example, the presence of visible wavelengths; likewise, by a colorless state, in embodiments, refers to for example, the complete or substantial absence of visible wavelengths.

In embodiments, the image forming medium generally comprises an imaging layer coated on or impregnated in a suitable substrate material, or sandwiched or laminated between a first and a second substrate material (i.e., a substrate material and an overcoat layer).

The imaging layer can include any suitable photochromic material and solvent or polymer binder. For example, the photochromic material and solvent or polymer binder are selected such that when the photochromic material is dissolved or dispersed in the solvent or polymer binder, the photochromic material is in its clear, generally non-aggregated state. However, when the photochromic material is exposed to a first stimulus, such as ultraviolet light, the photochromic material isomerizes to a more polar form, which reversibly precipitates out of solution to form a visible material, such as in a crystalline or aggregated form. This precipitation can be reversed, and thus making the image susceptible to erasure and the photochromic paper returned to a blank state, by various means such as by applying a second stimulus such as sonic irradiation and/or heat and then light that reverses the isomerization reaction and resolubilizes the photochromic material in the solvent or polymer binder, thus enabling the reverse chemical reaction that returns the photochromic material to its clear state. In the colored state, the image can remain visible for a period of two days or more, providing increased usefulness of the photochromic paper.

In embodiments, the photochromic material is a substituted fulgide or substituted dithienylethene dispersed in a solvent or polymeric binder, where the photochromic material and solvent or polymeric binder are mutually specifically selected such that the imaging composition exhibits a reversible homogeneous-heterogeneous transition after the chemical transformation between a colorless and a colored state. The photochromic material exhibits photochromism, which is a reversible transformation of a chemical species induced in one or both directions by absorption of an electromagnetic radiation between two forms having different absorption spectra. The first form is thermodynamically stable and may be induced by absorption of light such as ultraviolet light to convert to a second form. The reverse reaction from the second form to the first form may occur, for example, by absorption of light such as visible light. Various exemplary embodiments of the photochromic material may also encompass the reversible transformation of the chemical species among three or more forms in the event it is possible that reversible transformation occurs among more than two forms. The photochromic material of embodiments may be composed of one, two, three, four, or more different types of photochromic materials, each of which has reversibly interconvertible forms. As used herein, the term "photochromic material" refers to all molecules of a specific species of the photochromic material, regardless of their temporary isomeric forms. In various exemplary embodiments, for each type of photochromic material, one form may be colorless or weakly colored and the other form may be differently colored.

In embodiments, the reimageable paper also generally comprises a solvent or polymer binder mixture of a photochromic material dispersed or dissolved in a solvent or polymer binder, with the mixture coated on a suitable substrate material, or sandwiched between a first and a second substrate material. If desired, the mixture can be further constrained on the substrate material, or between the first and second substrate materials, such as by microencapsulating the solvent mixture, or the like.

The substituted fulgides and substituted dithienylethenes suitable for use in embodiments are those of the following general formulas:

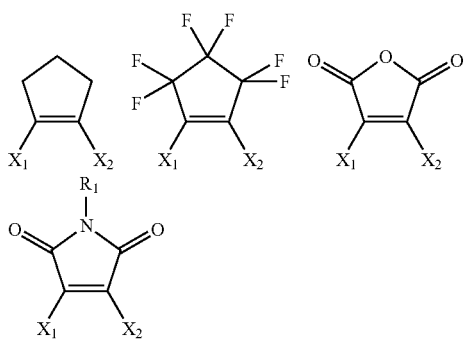

wherein each substituent $X_1$ and $X_2$ can be the same or different so as to give either symmetrical or unsymmetrical structures, and each $X_1$ and $X_2$ is independently chosen from compounds of the list shown below:

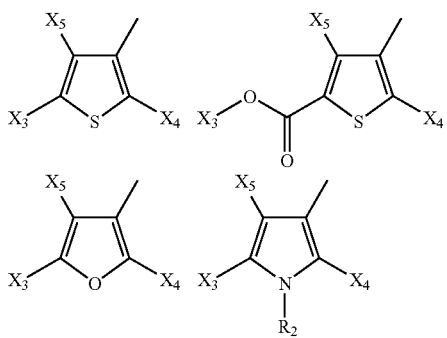

wherein substituents $X_3$, $X_4$, and $X_5$ can be aromatic, heterocyclic, aliphatic or a combination of thereof. $X_3$, $X_4$, and $X_5$ can also be joined in a contiguous fashion so as to form an annelated ring system.

In embodiments, $X_3$, $X_4$, and $X_5$ are independently chosen from hydrogen and a list of aggregating substituents of the following general formula:

(YA)$y_1$-BRIDGE-(YD)$y_2$ wherein each of YA and YD are optionally present. When YA and/or YD are present, one, two or more YA or YD groups may be present. Thus, for example $y_1$ and $y_2$ may independently equal 0, 1, 2, 3, 4, or more. In the formula, YA represents an electron acceptor group, YD represents an electron donor group, and BRIDGE represents a zzzconnecting group all suitably chosen as to promote aggregation between $X_3$, $X_4$, and/or $X_5$ groups or between the photochromic moieties when the photochromic compound is in the colored state. Connection to the photochromic moiety can be achieved through any of the YA, YD or BRIDGE. Thus, in some embodiments, one or two, but not all three at the same time of $X_3$, $X_4$, and $X_5$ is H, while in still other embodiments, none of $X_3$, $X_4$, and $X_5$ is H.

In a first embodiment, the BRIDGE moiety in this formula may be any suitable group that is a π-electron conjugated unit that is composed of, for example, (a) at least one aromatic ring such as one, two or more aromatic rings having for instance from about 6 carbon atoms to about 60 carbon atoms, such as —$C_6H_4$—, and —$C_6H_4$—$C_6H_4$—; (b) at least one aromatic ring such as one, two or more aromatic rings conjugated through one or more ethenyl or ethynyl bonds having for instance from about 8 carbon atoms to about 60 carbon atoms, such as —$C_6H_4$—CH=CH—$C_6H_4$—, and —$C_6H_4$—C≡C—$C_6H_4$—; (c) fused aromatic rings having for instance from about 10 to about 60 carbon atoms such as 1,4-$C_{10}H_6$ and 1,5-$C_{10}H_6$; and (d) at least one aromatic heterocyclic ring having from about 5 to about 30 atoms (referring to number of carbon atoms and heteroatom(s)) where the heteroatom is for example oxygen (like for example furan, benzofuran, dibenzofuran), sulfur (like for example 1,4-dithiin, benzo-1,4-dithiin, dibenzo-1,4-dithiin, tetrathiafulvalene, thiophen, benzothiophen, dibenzothiophen), nitrogen (like for example pyrrole, indole, carbazole, pyrazole, imidazol), selenium (like for example selenophen, benzoselenophen, dibenzoselenophen), and tellurium (like for example tellurophen, benzotellurophen, dibenzotellurophen).

In this embodiment, aggregation is promoted essentially between $X_3$, $X_4$, and $X_5$ by dipolar interactions between the YA and YD groups through the BRIDGE, with optional π-stacking between photochromic moieties or between $X_3$, $X_4$, and X5 groups.

When YA and YD are H atom, $X_3$, $X_4$, and $X_5$ aggregation is promoted by π-stacking between aromatic rings of the $X_3$, $X_4$, and $X_5$ groups and optionally between the photochromic groups.

In a second embodiment, the BRIDGE unit of the $X_3$, $X_4$, and $X_5$ groups is an aliphatic hydrocarbon structure. The hydrocarbon may be for example the following:

(a) a straight chain alkyl group having for example 4 to about 30 carbon atoms, such as pentyl, decyl and dodecyl.

(b) a branched alkyl group having for example 5 to about 40 carbon atoms, such as isopentyl and 2-propyl-pentyl.

(c) at least one cycloalkyl group such as one, two or more bonded cycloalkyl groups having for example 3 to about 8 carbon atoms, particularly 4 to 7 carbon atoms in the cycle, such as cyclopentyl and cyclohexyl. Optionally, one or more hydrogen atoms of the cycloalkyl group may be replaced with for example an alkyl group having for example 1 to about 20 carbon atoms, an arylalkyl group having for example 6 to about 30 carbon atoms, a cycloalkyl group having for example 3 to about 8 carbon atoms or 4 to 7 carbon atoms in the cycle, or an alkylcycloalkyl group having for example 4 to about 30 carbons.

(d) an arylalkyl group or alkylaryl group having for example 7 to about 30 carbon atoms such as p-methyl-benzyl, 3-(p-ethyl-phenyl)-propyl and 5-(1-naphthyl)-pentyl.

When the BRIDGE unit is an aliphatic hydrocarbon structure, aggregation of the photochromic groups is due to the hyrophobicity of the hydrocarbon chain.

The electron donor moiety YD may be any suitable atom or group capable of donating electrons, which in embodiments according to Hammett equation may possess a negative Hammett constant ($\sigma p$). In embodiments, the electron donor moiety YD is an atom which may require one or more additional moieties in order to fulfill its valence requirements (for example, a nitrogen atom has three valences). In embodiments, the electron donor moiety YD may be selected from the group consisting of:

(a) an atom selected from the group consisting of N, O, S, P, Cl, Br, and I, where the valence of the atom is satisfied by bonding with additional moieties;

(b) ferrocenyl;

(c) azulenyl;

(d) an alkyl group such as having from 1 to about 20 carbon atoms or more, such as methyl, ethyl, and the like. The alkyl group may be optionally branched.

The other moiety or moieties to fulfill the valence requirements of the YD atom may be, for instance, a hydrogen atom, or a hydrocarbon group such as the following:

(a) a straight alkyl chain having for example 1 to about 20 carbon atoms, such as 1 to about 12 carbon atoms, such as pentyl, decyl and dodecyl;

(b) a branched alkyl group having for example 3 to about 40 carbon atoms, such as 3 to about 30 carbon atoms such as isopropyl, isopentyl and 2-propyl-pentyl;

(c) a cycloalkyl group having for example 3 to about 30 carbon atoms, such as 4 to about 7 carbon atoms in the cycle, such as cyclopentyl and cyclohexyl; and (d) an aryl group, an arylalkyl group or alkylaryl group having for example 7 to about 30 carbon atoms such as p-methyl-benzyl, 3-(p-ethyl-phenyl)-propyl and 5-(1-naphthyl)-pentyl.

The electron acceptor moiety YA may be any suitable atom or group capable of accepting electrons. In embodiments, the electron acceptor moiety YA is an electron withdrawing functional moiety which according to Hammett equation possesses a positive Hammett constant ($\sigma p$). The electron acceptor moiety YA may be for example the following:

(a) an aldehyde (—CO—H);

(b) a ketone (—CO—R) where R may be for example a straight chain alkyl group having for example 1 to about 20 carbon atoms, such as 1 to about 12 carbon atoms, such as methyl, ethyl, pentyl, decyl and dodecyl; a branched alkyl group having for example 3 to about 40 carbon atoms, such as 3 to about 30 carbon atoms such as isopropyl, isopentyl and 2-propyl-pentyl, a cycloalkyl group having for example 3 to about 30 carbon atoms, such as 4 to about 7 carbon atoms in the cycle, such as cyclopentyl and cyclohexyl; an arylalkyl group or alkylaryl group having for example 7 to about 30 carbon atoms such as p-methyl-benzyl, 3-(p-ethyl-phenyl)-propyl and 5-(1-naphthyl)-pentyl;

(c) an ester (—COOR) where R may be for example a straight chain alkyl group having for example 1 to about 20 carbon atoms, such as 1 to about 12 carbon atoms, such as pentyl, decyl and dodecyl, a branched alkyl group having for example 3 to about 40 carbon atoms, such as 3 to about 30 carbon atoms such as isopropyl, isopentyl and 2-propyl-pentyl, a cycloalkyl group having for example 3 to about 30 carbon atoms, such as 4 to about 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl;

(d) a carboxylic acid (—COOH);

(e) cyano (CN);

(f) nitro ($NO_2$);

(g) nitroso (N=O);

(h) a sulfur-based group (e.g., —$SO_2$—$CH_3$; and —$SO_2$—$CF_3$);

(i) a fluorine atom;

(j) an alkene (—CH=$CR_2$ or —CH=CHR) where each R independently may be for example a straight chain alkyl group having for example 1 to about 20 carbon atoms, such as 1 to about 12 carbon atoms, such as pentyl, decyl and dodecyl, a branched alkyl group having for example 3 to about 40 carbon atoms, such as 3 to about 30 carbon atoms such as isopropyl, isopentyl and 2-propyl-pentyl, a cycloalkyl group having for example 3 to about 30 carbon atoms, such as 4 to about 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and (k) a boron atom.

When YA and YD are present in the structure of the $X_3$, $X_4$, or $X_5$ groups, they promote aggregation of the photochromic molecules by antiparallel alignment of the groups $X_3$, $X_4$, and/or $X_5$ of neighboring photochromic molecules incorporating these structures.

Exemplary examples of suitable $X_3$, $X_4$, or $X_5$ groups include but are not limited to:

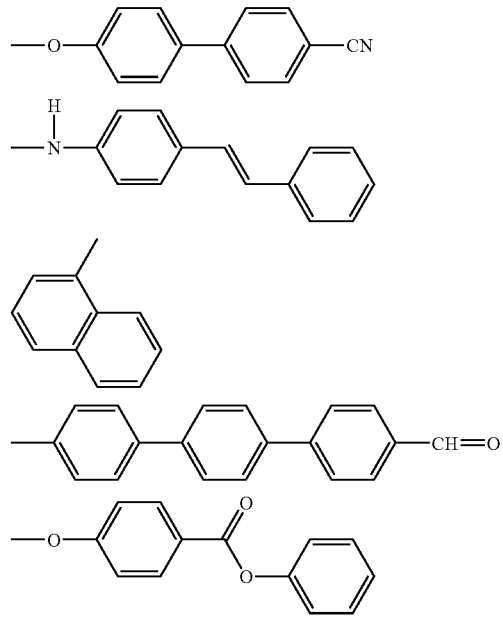

-continued

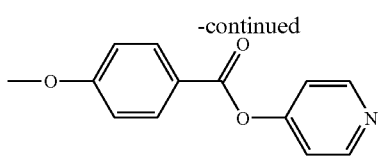

where substituents $X_3$, $X_4$, and $X_5$ can be aromatic, heterocyclic, aliphatic or a combination of these. $X_4$ and $X_5$ can also be joined in a contiguous fashion so as to form an annelated ring system. Substituents $R_1$ and $R_2$ are independently alkyl, aliphatic, aromatic, heterocyclic, or heteroaromatic and any combination of these, having from 1 to about 20 or to about 40 carbon atoms.

Specific examples of the materials include

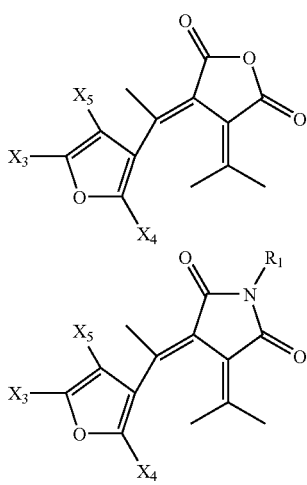

where the substituents are defined as above.

These photochromic materials are different from other photochromic materials, including other differently substituted or unsubstituted fulgides and dithienylethenes, in that the materials, in combination with a suitable solvent or polymer binder, can be induced to aggregate, precipitate or phase separate from the solvent or polymer binder. Once aggregated, the stacking of the photochromic material prevents the ring opening of the decolorization step. This allows for a desirable product because the aggregation provides a reimageable paper document where if the substrate is heated and the ring open aggregate is driven into solution or molecular dispersion, the decolorization proceeds as desired. The photochromic materials of embodiments differ from other photochromic materials or mixtures of other photochromic materials and other solvents or polymer binders, in that the volume of activation for known compounds or mixtures is very small, and thus decolorization can occur even in the solid state. See, for example, M. Irie. *Chem. Reviews,* 100, 1685-1716 (2000). However, in embodiments of the disclosure where the substituents are chosen carefully so that the hybridization of the cyclization carbon atom centers induces a large change in the crystal or aggregate lattice, then the colored state can be frozen until heat or other stimuli induces enough lattice mobility to allow the structural reorganization to occur. For example, Schemes 1 and 2 below show a conventional fulgide (Scheme 1) and dithienylethene (Scheme 2) where the material decolorizes even in the solid state, whereas Scheme 3 shows an example of a dithienylethenes that does not decolorize in the solid state:

Scheme 1

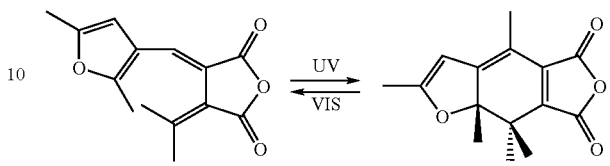

Scheme 2

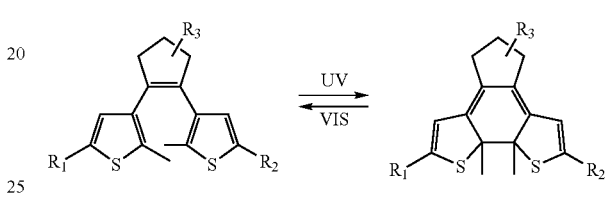

Scheme 3

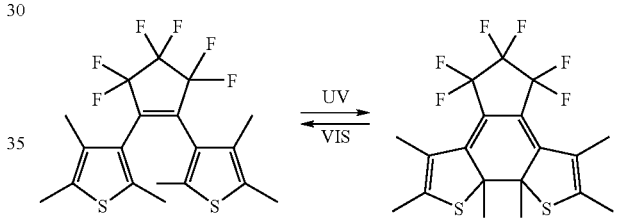

In addition, to help avoid undesired premature erasure and to withstand heat, it is desired in embodiments that the photochromic material be thermally stable. For example, the common photochromic material spiropyran is not thermally stable. This material fades from its colored state even at room temperature. Accordingly, suitable thermally stable photochromic materials that can be used in these embodiments include various substituted fulgides and substituted dithienylethenes. However fulgides and dithienylethenes suffer from light fatigue and revert to their colorless state on exposure to ambient room light.

Exemplary structures of these photochromic materials, and how they change state, are shown below:

Diarylethenes

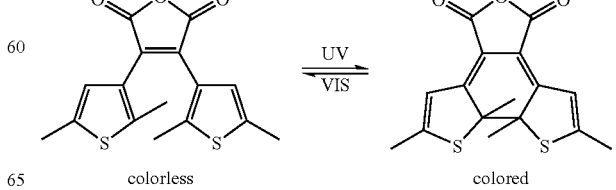

-continued

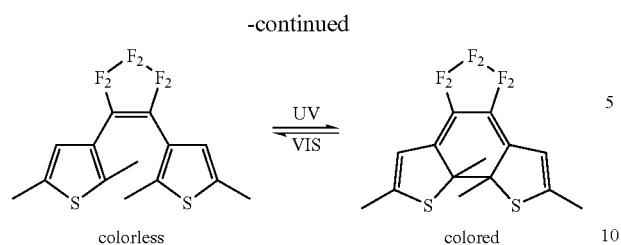

colorless → UV/VIS → colored

Fulgides

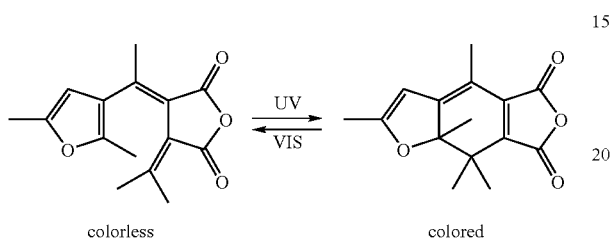

colorless → UV/VIS → colored

For applications such as erasable paper it is important to have room temperature and ambient light stability form more than two days (such as stable for a month or more) without having to use a high temperature or long exposure times as part of the erase procedure. Substituted fulgides and dithienylethenes of this disclosure are thus particularly suitable in such applications. For example, the Scheme below shows the writing and erase process for exemplary compounds.

Erasable Paper Write Phase

Erasable Paper Erase Phase

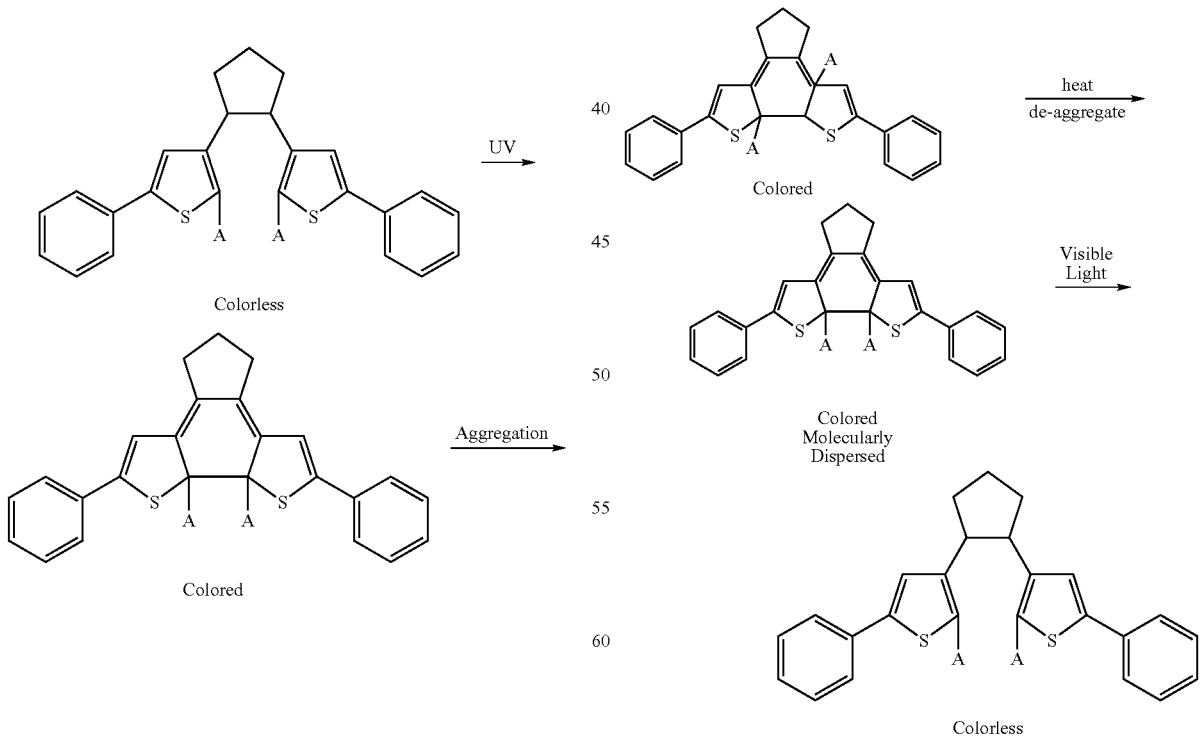

The image forming material (photochromic material) is dissolved or dispersed in any suitable carrier, such as a solvent, a polymer binder, or the like. Suitable solvents include, for example, straight chain aliphatic hydrocarbons, branched chain aliphatic hydrocarbons, and the like, such as where the straight or branched chain aliphatic hydrocarbons have from about 1 to about 30 carbon atoms. For example, a non-polar liquid of the ISOPAR™ series (manufactured by the Exxon Corporation) may be used as the solvent. These hydrocarbon liquids are considered narrow portions of isoparaffinic hydrocarbon fractions. For example, the boiling range of ISOPAR G™ is from about 157° C. to about 176° C.; ISOPAR H™ is from about 176° C. to about 191° C.; ISOPAR K™ is from about 177° C. to about 197° C.; ISOPAR L™ is from about 188° C. to about 206° C.; ISOPAR M™ is from about 207° C. to about 254° C.; and ISOPAR V™ is from about 254.4° C. to about 329.4° C. Other suitable solvent materials include, for example, the NORPAR™ series of liquids, which are compositions of n-paraffins available from Exxon Corporation, the SOLTROL™ series of liquids available from the Phillips Petroleum Company, and the SHELLSOL™ series of liquids available from the Shell Oil Company. Mixtures of one or more solvents, i.e., a solvent system, can also be used, if desired. In addition, more polar solvents can also be used, if desired. Examples of more polar solvents that may be used include halogenated and nonhalogenated solvents, such as tetrahydrofuran, trichloro- and tetrachloroethane, dichloromethane, chloroform, monochlorobenzene, toluene, xylenes, acetone, methanol, ethanol, xylenes, benzene, ethyl acetate, dimethylformamide, cyclohexanone, N-methyl acetamide and the like. The solvent may be composed of one, two, three or more different solvents. When two or more different solvents are present, each solvent may be present in an equal or unequal amount by weight ranging for example from about 5% to 90%, particularly from about 30% to about 50%, based on the weight of all solvents.

Both compositions dispersable in either organic polymers or waterborne polymers can be used, depending on the used components. For example, for waterborne compositions, polyvinylalcohol is a suitable application solvent, and polymethylmethacrylate is suitable for organic soluble compositions.

Suitable examples of polymer binders include, but are not limited to, polyalkylacrylates like polymethyl methacrylate (PMMA), polycarbonates, polyethylenes, oxidized polyethylene, polypropylene, polyisobutylene, polystyrenes, poly (styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, and the like. Copolymer materials such as polystyrene-acrylonitrile, polyethylene-acrylate, vinylidenechloride-vinylchloride, vinylacetate-vinylidene chloride, styrene-alkyd resins are also examples of suitable binder materials. The copolymers may be block, random, or alternating copolymers. In some embodiments, polymethyl methacrylate or a polystyrene is the polymer binder, in terms of their cost and wide availability. The polymer binder, when used, has the role to provide a coating or film forming composition.

Depending upon the carrier used, the photochromic material when forming the desired colored aggregates can precipitate or phase separate from the carrier. Thus, for example, where the carrier is a solvent, exposure of the photochromic material to a sensitizing UV light can cause the material to convert from a dissolved colorless state to a precipitated aggregated colored state, and exposure of the photochromic material to a second stimuli such as heat or sonication can cause the material to convert back from the precipitated aggregated colored state to the dissolved colorless state. Likewise, where the carrier is a polymer binder, exposure of the photochromic material to a sensitizing UV light can cause the material to convert from a dispersed colorless state to a phase separated aggregated colored state, and exposure of the photochromic material to a second stimuli such as heat or sonication can cause the material to convert back from the phase separated aggregated colored state to the dispersed colorless state.

Phase change materials can also be used as the polymer binder. Phase change materials are known in the art, and include for example crystalline polyethylenes such as Polywax® 2000, Polywax® 1000, Polywax® 500, and the like from Baker Petrolite, Inc.; oxidized wax such as X-2073 and Mekon wax, from Baker-Hughes Inc.; crystalline polyethylene copolymers such as ethylene/vinyl acetate copolymers, ethylene/vinyl alcohol copolymers, ethylene/acrylic acid copolymers, ethylene/methacrylic acid copolymers, ethylene/carbon monoxide copolymers, polyethylene-b-polyalkylene glycol wherein the alkylene portion can be ethylene, propylene, butylenes, pentylene or the like, and including the polyethylene-b-(polyethylene glycol)s and the like; crystalline polyamides; polyester amides; polyvinyl butyral; polyacrylonitrile; polyvinyl chloride; polyvinyl alcohol hydrolyzed; polyacetal; crystalline poly(ethylene glycol); poly (ethylene oxide); poly(ethylene therephthalate); poly (ethylene succinate); crystalline cellulose polymers; fatty alcohols; ethoxylated fatty alcohols; and the like, and mixtures thereof.

In embodiments, the imaging composition can be applied in one form, and dried to another form for use. Thus, for example, the imaging composition comprising photochromic material and solvent or polymer binder may be dissolved or dispersed in a solvent for application to or impregnation into a substrate, with the solvent being subsequently evaporated to form a dry layer.

In general, the imaging composition can include the carrier and imaging material in any suitable amounts, such as from about 5 to about 99.5 percent by weight carrier, such as from about 30 to about 70 percent by weight carrier, and from about 0.05 to about 50 percent by weight photochromic material, such as from about 0.1 to about 5 percent photochromic material by weight.

The photochromic material and solvent or polymer binder are suitably selected such that the solvent mixture exhibits a reversible homogeneous-heterogeneous transition between a colorless state, an intermediate colorless or colored erasable state, and a final colored stable state. That is, the photochromic material and solvent or polymer are selected such that the solvent or polymer solubilizes the relatively less polar colorless form of the photochromic material, but does not necessarily solubilize and thus precipitates or phase separates the relatively more polar aggregated colored form of the photochromic material. Although not to be desired to be limited by theory, this difference in solubility of the colorless and colored forms of the photochromic material in the solvent or polymer causes the photochromic material to be dissolved or dispersed in the solvent or polymer when in the colorless form, but to precipitate or phase separate out of the solvent or polymer as a visible material when in the colored form. When precipitated or phase separated, the colored form of the photochromic material tends to form crystals or aggregates in embodiments, which absorb visible light over much of the visible spectrum. These crystals or aggregates can be of the order of several microns in size, and are opaque and polydisperse (meaning that not all of the precipitate/aggregate particles are of the same size). As a result, the precipitated colored form exhibits a very dark gray, or almost black, color. In contrast, prior photochromic materials exhibited high light absorption at only around 570 nm, providing a less contrasting, purple coloration.

Suitable selection of solvent or polymer and photochromic material can be readily conducted. For example, suitable selection of the materials can be made by routine testing, measurement, and/or prediction of the relative solubility of the colorless and colored forms of a particular photochromic material in a particular solvent, polymer, or solvent/polymer system.

The photochromic material and the carrier solvent or binder polymer may also be encapsulated for deposition on a paper substrate.

In an embodiment, selection of a suitable photochromic material can be made, for example, by comparing the relative difference in dipole moments of the colorless and colored forms of the photochromic material. For example, to permit the desired precipitation or phase separation of the colored form, it is desired in embodiments that the colorless and colored forms of the photochromic material have different propensities to aggregate. The aggregating substituent groups, generally designated by the $X_1$ and $X_2$ groups in the structures above, encourages aggregation in the ring closed colored state of dithienylethenes and fulgides because of strong intermolecular forces that come into play, because the $X_1$ and $X_2$ groups interact in the aggregate.

For applying the imaging layer to the image forming medium substrate, the image forming layer composition can be applied in any suitable manner. For example, the image forming layer composition can be mixed and applied with any suitable solvent or polymer binder, and subsequently hardened or dried to form a desired layer. Further, the image forming layer composition can be applied either as a separate distinct layer to the supporting substrate, or it can be applied so as to impregnate into the supporting substrate.

The image forming medium may comprise a supporting substrate, coated or impregnated on at least one side with the imaging layer. As desired, the substrate can be coated or impregnated on either only one side, or on both sides, with the imaging layer. When the imaging layer is coated or impregnated on both sides, or when higher visibility of the image is desired, an opaque layer may be included between the supporting substrate and the imaging layer(s) or on the opposite side of the supporting substrate from the coated imaging layer. Thus, for example, if a one-sided image forming medium is desired, the image forming medium may include a supporting substrate, coated or impregnated on one side with the imaging layer and coated on the other side with an opaque layer such as, for example, a white layer. Also, the image forming medium may include a supporting substrate, coated or impregnated on one side with the imaging layer and with an opaque layer between the substrate and the imaging layer. If a two-sided image forming medium is desired, then the image forming medium may include a supporting substrate, coated or impregnated on both sides with the imaging layer, and with at least one opaque layer interposed between the two coated imaging layers. Of course, an opaque supporting substrate, such as conventional paper, may be used in place of a separate supporting substrate and opaque layer, if desired.

Any suitable supporting substrate may be used. For example, suitable examples of supporting substrates include, but are not limited to, glass, ceramics, wood, plastics, paper, fabrics, textile products, polymeric films, inorganic substrates such as metals, and the like. The plastic may be for example a plastic film, such as polyethylene film, polyethylene terephthalate, polyethylene naphthalate, polystyrene, polycarbonate, polyethersulfone. The paper may be, for example, plain paper such as XEROX® 4024 paper, ruled notebook paper, bond paper, silica coated papers such as Sharp Company silica coated paper, Jujo paper, and the like. The substrate may be a single layer or multi-layer where each layer is the same or different material. In embodiments, the substrate has a thickness ranging for example from about 0.3 mm to about 5 mm, although smaller or greater thicknesses can be used, if desired.

When an opaque layer is used in the image forming medium, any suitable material may be used. For example, where a white paper-like appearance is desired, the opaque layer may be formed from a thin coating of titanium dioxide, or other suitable material like zinc oxide, inorganic carbonates, and the like. The opaque layer can have a thickness of, for example, from about 0.01 mm to about 10 mm, such as about 0.1 mm to about 5 mm, although other thicknesses can be used.

If desired, a further overcoating layer may also be applied over the applied imaging layer. The further overcoating layer may, for example, be applied to further adhere the underlying layer in place over the substrate, to provide wear resistance, to improve appearance and feel, and the like. The overcoating layer can be the same as or different from the substrate material, although in embodiments at least one of the overcoating layer and substrate layer is clear and transparent to permit visualization of the formed image. The overcoating layer can have a thickness of, for example, from about 0.01 mm to about 10 mm, such as about 0.1 mm to about 5 mm, although other thicknesses can be used. However, in embodiments, an overcoating layer is not used, so as to allow easy evaporation of water formed during the imaging step, in a post-imaging heating step. For example, if desired or necessary, the coated substrate can be laminated between supporting sheets such as plastic sheets.

In embodiments where the imaging material is coated on or impregnated into the substrate, the coating can be conducted by any suitable method available in the art, and the coating method is not particularly limited. For example, the imaging material can be coated on or impregnated into the substrate by dip coating the substrate into a solution of the imaging material composition followed by any necessary drying, or the substrate can be coated with the imaging composition to form a layer thereof. Similarly, the protective coating can be applied by similar methods.

Where the photochromic material is mixed with a solvent applied on the substrate, and where the solvent system is retained in the final product, additional processing may be required. As a result, where the photochromic material is simply coated on the substrate, a cover material is generally applied over the solvent system to constrain the solvent system in place on the substrate. Thus, for example, the cover material can be a solid layer, such as any of the suitable materials disclosed above for the substrate layer. In an alternative embodiment, a polymer material or film may be applied over the photochromic material, where the polymer film penetrates the photochromic material at discrete points to in essence form pockets or cells of photochromic material that are bounded on the bottom by the substrate and on the sides and top by the polymeric material. The height of the cells can be, for example, from about 1 micron to about 1000 microns, although not limited thereto. The cells can be any shape, for example square, rectangle, circle, polygon, or the like. In these embodiments, the cover material is advantageously transparent and colorless, to provide the full color contrast effect provided by the photochromic material.

In another embodiment, the solvent system with the photochromic material can be encapsulated or microencapsulated, and the resultant capsules or microcapsules deposited or coated on the substrate as described above. Any suitable encapsulation technique can be used, such as simple and complex coacervation, interfacial polymerization, in situ polymerization, phase separation processes. For example, a suitable method if described for ink materials in U.S. Pat. No. 6,067,185, the entire disclosure of which is incorporated herein by reference and can be readily adapted to the present disclosure. Useful exemplary materials for simple coacervation include gelatin, polyvinyl alcohol, polyvinyl acetate and cellulose derivatives. Exemplary materials for complex coacervation include gelatin, acacia, acrageenan, carboxymethylecellulose, agar, alginate, casein, albumin, methyl vinyl ether-co-maleic anhydride. Exemplary useful materials for interfacial polymerization include diacyl chlorides such as sebacoyl, adipoyl, and di or poly-amines or alcohols and isocyanates. Exemplary useful materials for in situ polymerization include for example polyhydroxyamides, with aldehydes, melamine or urea and formaldehyde; water-soluble oligomers of the condensate of melamine or urea and formaldehyde, and vinyl monomers such as for example styrene, methyl methacrylate and acrylonitrile. Exemplary useful materials for phase separation processes include polystyrene, polymethylmethacrylate, polyethylmethacrylate, ethyl cellulose, polyvinyl pyridine and polyacrylonitrile. In these embodiments, the encapsulating material is also transparent and colorless, to provide the full color contrast effect provided by the photochromic material.

Where the photochromic material is encapsulated, the resultant capsules can have any desired average particle size. For example, suitable results can be obtained with capsules having an average size of from about 2 to about 1000 microns, such as from about 10 to about 600 or to about 800 microns, or from about 20 to about 100 microns, where the average size refers to the average diameter of the microcapsules and can be readily measured by any suitable device such as an optical microscope. For example, in embodiments, the capsules are large enough to hold a suitable amount of photochromic material to provide a visible effect when in the colored form, but are not so large as to prevent desired image resolution.

In its method aspects, the present disclosure involves providing an image forming medium comprised of a substrate and an imaging layer comprising a substituted fulgide or substituted dithienylethene dispersed in a solvent or polymeric binder, where the composition exhibits a reversible homogeneous-heterogeneous transition between a colorless state, an intermediate colorless or colored erasable state, and a final colored stable state, the photochromic material converting from the colorless state to the colored stable state upon irradiation with light of a first wavelength and converting from the colored stable state to the colorless state upon exposure to heat and light. To provide separate writing and erasing processes, imaging is conducted by applying a first stimulus, such as UV light irradiation, to the imaging material to cause a color change, and erasing is conducted by applying a second, different stimulus, such as heat or sonication, to the imaging material to reverse the color change. Thus, for example, the imaging layer as a whole could be sensitive at a first (such as UV) wavelength that causes the photochromic material to convert from a clear to a colored state, while the imaging layer as a whole could be sensitive at a second, different (such as visible) wavelength that causes the photochromic material to convert from the colored back to the clear state.

In embodiments, heating can be applied to the imaging layer before or at the same time as the light irradiation, for either the writing and/or erasing processes. However, in embodiments, heating is not required for the writing process, as such stimuli as UV light irradiation are sufficient to cause the color change from colorless to colored, while heating may be desired for the erasing process to assist in increasing material mobility for speeding the color change from colored to colorless. When used, the heat raises the temperature of the imaging composition, particularly the photochromic material, to raise the mobility of the imaging composition and thus allow easier and faster conversion from one color state to the other and then on to the colorless state. The heating can be applied before or during the irradiation, if the heating causes the imaging composition to be raised to the desired temperature during the irradiation. Any suitable heating temperature can be used, and will depend upon, for example, the specific imaging composition used. For example, where the photochromic material is dispersed in a polymer or a phase change composition, the heating can be conducted to raise the polymer to at or near its glass transition temperature or melting point, such as within about 5° C., within about 10° C., or within about 20° C. of the glass transition temperature or melting point, although it is desired in certain embodiments that the temperature not exceed the glass transition temperature or melting point so as to avoid undesired movement or flow of the polymer on the substrate. In other embodiments, for example where the photochromic material is dispersed in a solvent, the heating can be conducted to raise the solvent to at or near its boiling point, such as within about 5° C., within about 10° C., or within about 20° C. of the boiling point, although it is desired in certain embodiments that the temperature not exceed the boiling point so as to avoid loss or vaporization of solvent. In other embodiments, sonication or ultrasonic agitation can be used with or without heating to further assist in the writing or erasing process.

The different stimuli, such as different light irradiation wavelengths, can be suitably selected to provide distinct writing and erasing operations. For example, in one embodiment, the photochromic material is selected to be sensitive to UV light to cause isomerization from the clear state to the colored state, but to be sensitive to visible light to cause isomerization from the colored state to the clear state. In other embodiments, the writing and erasing wavelengths are separated by at least about 10 nm, such as at least about 20 nm, at least about 30 nm, at least about 40 nm, at least about 50 nm, or at least about 100 nm. Thus, for example, if the writing wavelength is at a wavelength of about 360 nm, then the erasing wavelength is desirably a wavelength of less than about 350 nm or greater than about 370 nm. Of course, the relative separation of sensitization wavelengths can be dependent upon, for example, the relatively narrow wavelengths of the exposing apparatus.

In a writing process, the image forming medium is exposed to an imaging light having an appropriate activating wavelength, such as a UV light source such as a light emitting diode (LED), in an imagewise fashion. The imaging light supplies sufficient energy to the photochromic material to cause the photochromic material to convert, such as isomerize, from a clear state to a colored state to produce a colored image at the imaging location. The amount of energy irradiated on a particular location of the image forming medium can affect the intensity or shade of color generated at that location. Thus, for example, a weaker intensity image can be formed by delivering a lesser amount of energy at the location and thus generating a lesser amount of colored photochromic unit, while a stronger intensity image can be formed by delivering a greater amount of energy to the location and thus generating a greater amount of colored photochromic unit. When suitable photochromic material, solvent or polymer binder, and irradiation conditions are selected, the variation in the amount of energy irradiated at a particular location of the image forming medium can thus allow for formation of grayscale images, while selection of other suitable photochromic materials can allow for formation of full color images.

Once an image is formed by the writing process, the formation of aggregates locks in the image. That is, the formed aggregates exhibit low mobility, and the hybridization of the cyclization carbon atom centers induces a large change in the crystal or aggregate lattice, whereby the colored state can be "frozen" or locked in, but which cannot be readily erased in the absence of a specific second stimuli. The imaging substrate thus provides a reimageable substrate that exhibits a long-lived image lifetime, but which can be erased as desired and reused for additional imaging cycles.

In an erasing process, the writing process is essentially repeated, except that a different stimuli, such as heat or sonication, is used, and when the photochromic material is optionally heated such as to a temperature at or near a glass transition, melting, or boiling point temperature of the carrier material. The erasing process induces enough lattice mobility to allow the structural reorganization to occur to allow the color change. Thus, the erasing process causes the photochromic unit to convert, such as isomerize, from a colored state to a clear state to erase the previously formed image at the imaging location. The erasing procedure can be on an imagewise fashion or on the entire imaging layer as a whole, as desired. The heating step is required for photochromic materials of the disclosure.

The separate imaging lights used to form the transient image and erase the transient image may have any suitable predetermined wavelength scope such as, for example, a single wavelength or a band of wavelengths. In various exemplary embodiments, the imaging lights are an ultraviolet (UV) light having a single wavelength or a narrow band of wavelengths. For example, the UV light can be selected from the UV light wavelength range of about 200 nm to about 475 nm, such as a single wavelength at about 365 nm or a wavelength band of from about 360 nm to about 370 nm. For forming the image, as well as for erasing the image, the image forming medium may be exposed to the respective imaging or erasing heat for a time period ranging from about 10 milliseconds to about 5 minutes, particularly from about 30 milliseconds to about 1 minute. The imaging light may have an intensity ranging from about 0.1 mW/cm$^2$ to about 100 mW/cm$^2$, particularly from about 0.5 mW/cm$^2$ to about 10 mW/cm$^2$.

In various exemplary embodiments, imaging light corresponding to the predetermined image may be generated for example by a computer or a Light Emitting Diode (LED) array screen and the image is formed on the image forming medium by placing the medium on or in proximity to the LED screen for the desired period of time. In other exemplary embodiments, a UV Raster Output Scanner (ROS) may be used to generate the UV light in an image-wise pattern. This embodiment is particularly applicable, for example, to a printer device that can be driven by a computer to generate printed images in an otherwise conventional fashion. That is, the printer can generally correspond to a conventional inkjet printer, except that the inkjet printhead that ejects drops of ink in the imagewise fashion can be replaced by a suitable UV light printhead that exposes the image forming medium in an imagewise fashion. In this embodiment, the replacement of ink cartridges is rendered obsolete, as writing is conducted using a UV light source. Other suitable imaging techniques that can be used include, but are not limited to, irradiating a UV light onto the image forming medium through a mask, irradiating a pinpoint UV light source onto the image forming medium in an imagewise manner such as by use of a light pen, and the like.

For erasing an image in order to reuse the imaging substrate, in various exemplary embodiments, the substrate can be exposed to heat, to cause the imaging material to assume a molecularly dispersed form and then exposed to visible light to erase the image. Such erasure can be conducted in any suitable manner, such as by exposing the entire substrate to the heat source and light at once, exposing the entire substrate to the erasing heat source in a successive manner such as by scanning the substrate, followed by light exposure, or the like. In other embodiments, erasing can be conducted at particular points on the substrate, such as by using a thermal head, or the like.

According to various exemplary implementations, the color contrast that renders the image visible to an observer may be a contrast between, for example two, three or more different colors. The term "color" may encompass a number of aspects such as hue, lightness and saturation, where one color may be different from another color if the two colors differ in at least one aspect. For example, two colors having the same hue and saturation but are different in lightness would be considered different colors. Any suitable colors such as, for example, red, white, black, gray, yellow, cyan, magenta, blue, and purple, can be used to produce a color contrast as long as the image is visible to the naked eye of a user. However, in terms of desired maximum color contrast, a desirable color contrast is a dark gray or black image on a light or white background, such as a gray, dark gray, or black image on a white background, or a gray, dark gray, or black image on a light gray background.

In various exemplary embodiments, the color contrast may change such as, for example, diminish during the visible time, but the phrase "color contrast" may encompass any degree of color contrast sufficient to render an image discernable to a user regardless of whether the color contrast changes or is constant during the visible time.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

A room temperature saturated solution in Isopar L of the following compound 1:

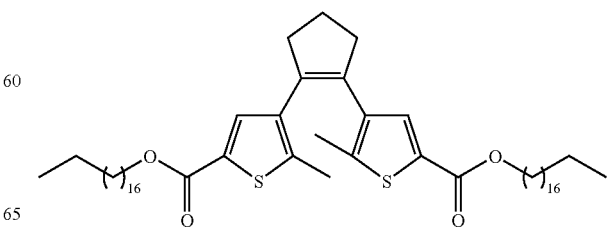

is prepared and the compound is then irradiated using a Xenon lamp with a 365 cutoff filter. On irradiating, the clear solution first turns reddish-blue and then a blue-brown (indicative of aggregation). The color is shown to be stable for more than 2 days. Reversion to the colorless form can be achieved by heating the mixture to dissolve the aggregates and thermally revert the ring closed form to the colorless ring open form.

Example 2

A saturated solution of compound 1 in xylene containing poly(methyl methacrylate) is coated on a plastic sheet and dried. On irradiation with a Xenon lamp the film colors strongly, initially in a reddish-blue color and then becomes blue-brown over time. The colored state persists for more than two days, but can be reversed by heating to reverse the aggregation process followed by thermal decoloration.

Example 3

A solution of compound 1 in isopar is encapsulated using the technique of complex coacervation described as follows. To a 500 mL Morton flask equipped with an overhead mixer and a 3-blade impeller are added 100 mL of a 6.6% gelatin solution, 400 mL of water, and 100 mL of a 6.6% solution of gum Arabic solution in warm water. The mixture is warmed to 40° C. Next, 60 mL of a solution of compound 1 dissolved in Isopar M is added to the aqueous solution under high shear mixing. Emulsification of the oil into the aqueous solution is continued until the desired droplet size is achieved, using optical microscopy as a guide. Next, the pH of the encapsulation solution is adjusted to 4.5 via dropwise addition of dilute acetic acid solution. Next, the encapsulation mixture is allowed to cool to room temperature with continued mixing. The resultant capsules are crosslinked with glutaraldehyde, washed with water, and wet-sieved to isolate the desired capsule size. The capsules are isolated and dried and coated onto a paper substrate. Irradiation using a Xenon lamp changes the capsules on the paper from colorless to first reddish-blue and then blue-brown indicative of aggregation. The color is stable for more than two days but can be reversed by heating the paper in an oven at 90° C. for 30 minutes.

Example 4

A solution from Example 2 is coated directly onto paper. Irradiation with a Xenon lamp causes a color change form colorless to reddish-blue and then blue-brown indicating aggregation. The colored form is stable for more than 2 days, but can be changed back by heating the substrate at 90° C. followed by flooding with visible light for 40 minutes.

Examples 5-8

Examples 1-4 are repeated, using the following compound 2:

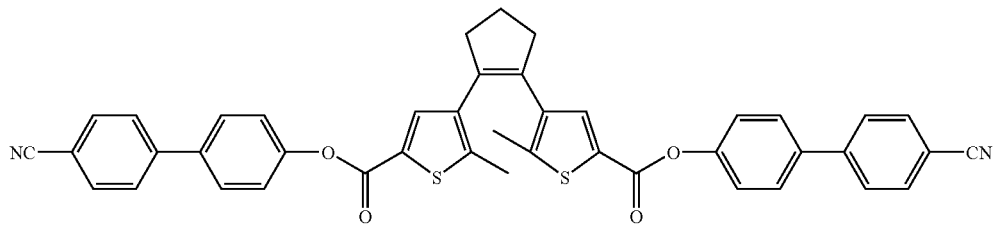

Similar results are obtained as described above.

Compounds 1 and 2 can be prepared from compound 3:

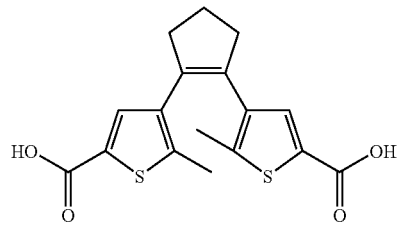

The preparation of compound 3 has been disclosed [Norsten, Tyler B.; Branda, Neil R. *Photoregulation of Fluorescence in a Porphyrinic Dithienylethene Photochrome.* Journal of the American Chemical Society (2001), 123(8), 1784-1785.]

Example 9

In a 500 milliliter round-bottomed flask at room temperature is added compound 3 (3 g, 8.61 mmol), and octadecan-1-ol (2.329 g, 8.61 mmol) in dichloromethane (250 ml) to give a colorless murky solution. Dicyclohexyldicyanodiimide (1.776 g, 8.61 mmol) is added dissolved in ~50 mL of dichloromethane. Dimethylaminopyridine (0.105 g, 0.861 mmol) is then added dissolved in ~25 ml of dichloromethane. The mixture is stirred for 24 hours, filtered and concentrated. The crude mixture is purified through plug of silica, using dichloromethane/hexane 1:1 as eluent. The product is compound 1.

Example 10

In a 500 milliliter round-bottomed flask at room temperature is added compound 3 (5 g, 14.35 mmol), and 4'-hydroxy-biphenyl-4-carbonitrile (2.80 g, 14.35 mmol) in dichloromethane (250 ml) to give a colorless murky solution. Dicyclohexylcarbodiimide (2.96 g, 14.35 mmol) is added dissolved in ~50 milliliters of dichloromethane. Dimethyldiaminopyridine (0.175 g, 1.435 mmol) is then added dissolved in ~25 ml of dichloromethane. The mixture is stirred for 24 hours, filtered and concentrated. The crude mixture is purified through plug of silica using dichloromethane/hexane 1:1 as eluent. The product is compound 2.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of forming an image, comprising:
    providing an image forming medium comprising:
        a substrate; and
        an imaging layer coated on or impregnated into said substrate, wherein the imaging layer comprises an imaging composition comprising a solvent or a polymeric binder, and a photochromic material selected from the group consisting of substituted fulgides and substituted dithienylethenes, dissolved or dispersed in said solvent or polymeric binder,
        wherein the solvent or polymeric binder and the photochromic material are selected so that:
            the imaging composition exhibits a reversible homogeneous-heterogeneous transition between a colorless state, an intermediate colorless or colored erasable state, and a final colored stable state,
            the photochromic material converts from the colorless state to the colored stable state upon irradiation with light of a first wavelength,
            the photochromic material converts from the colored stable state to the colorless state upon exposure to heat and light;
            the photochromic material is dissolved or dispersed in the solvent or polymeric binder when the photochromic material is in its colorless state, and
            the photochromic material is precipitated or phase separated from the solvent or polymeric binder as aggregates when the photochromic material is in its colored stable state; and
    exposing the image forming medium to UV irradiation of a first wavelength in an imagewise manner to form a visible image for a time period ranging from about 10 milliseconds to about 5 minutes at an intensity ranging from about 0.1 mW/cm$^2$ to about 100 mW/cm$^2$.

2. The method of claim 1, further comprising:
    exposing the image forming medium bearing said image to light irradiation of a second wavelength, with heating, wherein said light irradiation causes said photochromic material to change from the colored stable state to the colorless state; and
    repeating the step of exposing the image forming medium to the UV irradiation of a first wavelength in an imagewise manner at least one additional time.

3. An image forming medium, comprising
    a substrate; and
    an imaging layer coated on or impregnated into said substrate, wherein the imaging layer comprises an imaging composition comprising:
        a solvent or a polymeric binder, and
        a photochromic material selected from the group consisting of substituted fulgides and substituted dithienylethenes, dissolved or dispersed in said solvent or polymeric binder;
        wherein the solvent or polymeric binder and the photochromic material are selected so that:
            the imaging composition exhibits a reversible homogeneous-heterogeneous transition between a colorless state, an intermediate colorless or colored erasable state, and a final colored stable state;
            the photochromic material converts from the colorless state to the colored stable state upon irradiation with light of a first wavelength;
            the photochromic material converts from the colored stable state to the colorless state upon exposure to heat and light;
            the photochromic material is dissolved or dispersed in the solvent or polymeric binder when the photochromic material is in its colorless state; and
            the photochromic material is precipitated or phase separated from the solvent or polymeric binder as aggregates when the photochromic material is in its colored stable state.

4. The image forming medium of claim 3, wherein the solvent or polymeric binder and the photochromic material are selected so that the photochromic material converts from the colored stable state to the colorless state upon irradiation with light of the second wavelength only when the photochromic polymer is subjected to a stimuli selected from the group consisting of heating and ultrasonic agitation.

5. The image forming medium of claim 3, wherein the imaging composition is applied to the substrate in a layer or as microcapsules.

6. The image forming medium of claim 3, wherein the photochromic material is represented by one of the formulas:

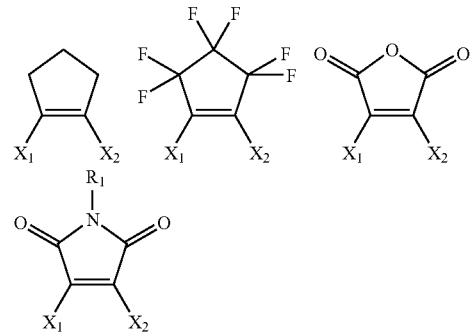

wherein each substituent $X_1$ and $X_2$ can be the same or different and is independently chosen from the structures:

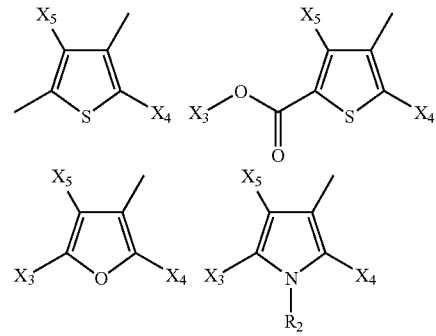

wherein substituents $X_3$, $X_4$, and $X_5$ are independently selected from the group consisting of hydrogen atoms, aromatic groups, heterocyclic groups, aliphatic groups, and combination thereof, having from 1 to about 40 carbon atoms, or $X_3$, $X_4$, and $X_5$ can also be joined in a contiguous fashion so as to form an annelated ring system, and R1 and R2 are independently alkyl, aliphatic, aromatic, heterocyclic, or heteroaromatic and any combination of these, having from 1 to about 40 carbon atoms, at least one of the substituents $X_3$, $X_4$, and $X_5$ is not hydrogen.

7. The image forming medium of claim 6, wherein $X_3$, $X_4$, and $X_5$ independently represent aggregating substituents of the general formula:

$$(YA)_{y_1}\text{-BRIDGE-}(YD)_{y_2}$$

wherein:
$y_1$ and $y_2$ independently equal 0, 1, 2, 3, or 4,
YA represents an electron acceptor group,
YD represents an electron donor group, and
BRIDGE represents a connecting group, and
each of YA, YB, and BRIDGE selected as to promote aggregation between the $X_3$, $X_4$, and $X_5$ groups or between the photochromic moieties of the photochromic compound when the photochromic compound is in the colored stable state.

8. The image forming medium of claim 7, wherein:
BRIDGE represents a π-electron conjugated unit selected from the group consisting of:
(a) a moiety having at least one aromatic ring and having from about 6 carbon atoms to about 60 carbon atoms;
(b) a moiety having at least one aromatic ring conjugated through one or more ethenyl or ethynyl bonds and having from about 8 carbon atoms to about 60 carbon atoms;
(c) fused aromatic rings having from about 10 to about 60 carbon atoms; and
(d) at least one aromatic heterocyclic ring having from about 5 to about 30 total carbon atoms and heteroatom;
YD independently represents H or an atom or group capable of donating electrons and has a negative Hammett constant (σp); and
YA independently represents H or an atom or group capable of accepting electrons and has a positive Hammett constant (σp).

9. The image forming medium of claim 7, wherein:
BRIDGE represents a group selected from the group consisting of $-C_6H_4-$, $-C_6H_4-C_6H_4-$, $-C_6H_4-CH=CH-C_6H_4-$, $-C_6H_4-C\equiv C-C_6H_4-$; 1,4-$C_{10}H_6$, 1,5-$C_{10}H_6$, furan, benzofuran, dibenzofuran, 1,4-dithiin, benzo-1,4-dithiin, dibenzo-1,4-dithiin, tetrathiafulvalene, thiophen, benzothiophen, dibenzothiophen, pyrrole, indole, carbazole, pyrazole, imidazol, selenophen, benzoselenophen, dibenzoselenophen, tellurophen, benzotellurophen, and dibenzotellurophen;
YD represents a group selected from the group consisting of:
(a) an atom selected from the group consisting of N, O, S, P, Cl, Br, and I, where the valence of the atom is satisfied by bonding with additional moieties selected from the group consisting of a hydrogen atom, a straight alkyl chain having from 1 to about 20 carbon atoms, a branched alkyl group having from 3 to about 40 carbon atoms, a cycloalkyl group having from 3 to about 30 carbon atoms; and an aryl group, an arylalkyl group or alkylaryl group having from 7 to about 30 carbon atoms;
(b) ferrocenyl;
(c) azulenyl; and
(d) a straight or branched alkyl group having from 1 to about 20 carbon atoms; and
YA represents a group selected from the group consisting of:
(a) an aldehyde of the formula $-CO-H$;

(b) a ketone of the formula $-CO-R$ where R represents a straight chain alkyl group having from 1 to about 20 carbon atoms, a branched alkyl group having from 3 to about 40 carbon atoms, a cycloalkyl group having from 3 to about 30 carbon atoms, or an arylalkyl group or alkylaryl group having from 7 to about 30 carbon atoms;
(c) an ester of the formula $-COOR$) where R represents a straight chain alkyl group having from 1 to about 20 carbon atoms, a branched alkyl group having from 3 to about 40 carbon atoms, a cycloalkyl group having from 3 to about 30 carbon atoms, or an arylalkyl group or alkylaryl group having from 7 to about 30 carbon atoms;
(d) a carboxylic acid of the formula $-COOH$;
(e) cyano of the formula $-CN$;
(f) nitro of the formula $-NO_2$;
(g) nitroso of the formula $-N=O$;
(h) a sulfur-based group of the formula $-SO_2-CH_3$ or $-SO_2-CF_3$;
(i) a fluorine atom;
(j) an alkene of the formula $-CH=CR_2$ or $-CH=CHR$ where each R independently represents a straight chain alkyl group having from 1 to about 20 carbon atoms, a branched alkyl group having from 3 to about 40 carbon atoms, a cycloalkyl group having from 3 to about 30 carbon atoms, or an arylalkyl group or alkylaryl group having from 7 to about 30 carbon atoms; and
(k) a boron atom.

10. The image forming medium of claim 7, wherein BRIDGE represents a group selected from the group consisting of:
(a) a straight chain alkyl group having 4 to about 30 carbon atoms;
(b) a branched alkyl group having 5 to about 40 carbon atoms;
(c) at least one cycloalkyl group having 3 to about 8 carbon atoms in the cycle, where optionally one or more hydrogen atoms of the cycloalkyl group may be replaced with an alkyl group having 1 to about 20 carbon atoms, an arylalkyl group having 6 to about 30 carbon atoms, a cycloalkyl group having 3 to about 8 carbon atoms in the cycle, or an alkylcycloalkyl group having 4 to about 30 carbons; and
(d) an arylalkyl group or alkylaryl group having 7 to about 30 carbon atoms.

11. The image forming medium of claim 7, wherein at least one of $X_3$, $X_4$, and $X_5$ is independently selected from the group consisting of:

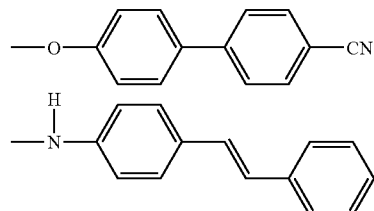

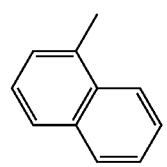

-continued

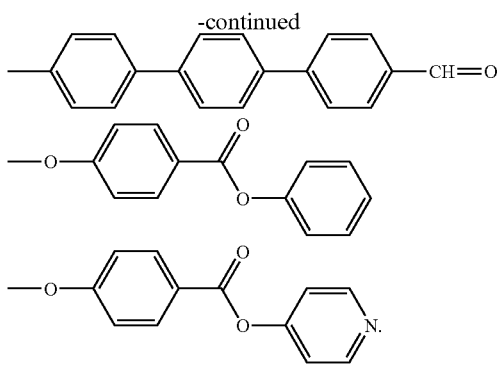

12. The image forming medium of claim 3, wherein the photochromic material is a substituted fulgide.

13. The image forming medium of claim 3, wherein the photochromic material is a substituted dithienylethene.

14. The image forming medium of claim 3, wherein the photochromic material is dispersed in a polymer selected from the group consisting of polyalkylacrylates, methyl methacrylate, polyvinylbutyral, polycarbonates, polyethylenes, oxidized polyethylene, polypropylene, polyisobutylene, polystyrenes, poly(styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, polystyrene-acrylonitrile, polyethylene-acrylate, vinylidenechloride-vinylchloride, vinylacetate-vinylidene chloride, styrene-alkyd resins, and mixtures thereof.

15. The image forming medium of claim 3, wherein the photochromic material is dissolved in a solvent selected from the group consisting of straight chain aliphatic hydrocarbons, branched chain aliphatic hydrocarbons, and mixtures thereof.

16. The image forming medium of claim 3, wherein the photochromic material in its colored stable state is functionalized so as to aggregate with proximate molecules of similar structure.

17. The image forming medium of claim 3, wherein the photochromic material is present in an amount of from about 0.01% to about 20% by weight of a total weight of the imaging composition.

18. The image forming medium of claim 3, wherein the substrate is selected from the group consisting of glass, ceramic, wood, plastic, paper, fabric, textile, metals, plain paper, and coated paper.

19. The image forming medium of claim 3, wherein the solvent mixture is provided in a form of encapsulated amounts of the solvent mixture.

20. A method of making an image forming medium, comprising applying an imaging layer composition to a substrate, wherein the imaging layer composition comprises a solvent or a polymeric binder, and a photochromic material selected from the group consisting of substituted fulgides and substituted dithienylethenes, dissolved or dispersed in said solvent or polymeric binder;
wherein the solvent or polymeric binder and the photochromic material are selected so that:
the imaging composition exhibits a reversible homogeneous-heterogeneous transition between a colorless state, an intermediate colorless or colored erasable state, and a final colored stable state;
the photochromic material converts from the colorless state to the colored stable state upon irradiation with light of a first wavelength;
the photochromic material converts from the colored stable state to the colorless state upon exposure to heat and light;
the photochromic material is dissolved or dispersed in the solvent or polymeric binder when the photochromic material is in its colorless state; and
the photochromic material is precipitated or phase separated from the solvent or polymeric binder as aggregates when the photochromic material is in its colored stable state.

21. The method of claim 20, wherein the applying comprises coating the imaging layer over the substrate or impregnating the imaging layer into the substrate.

22. An imaging system, comprising:
the image forming medium of claim 3; and
a printer comprising two irradiation sources, wherein one irradiation source sensitizes the photochromic material to convert the photochromic material from a colorless state to a colored stable state, and the other irradiation source converts the photochromic material from the colored stable state to the colorless state.

* * * * *